Feb. 6, 1945.   P. F. SKOOG   2,368,892
CLUTCH MECHANISM
Filed Nov. 25, 1942   2 Sheets-Sheet 1
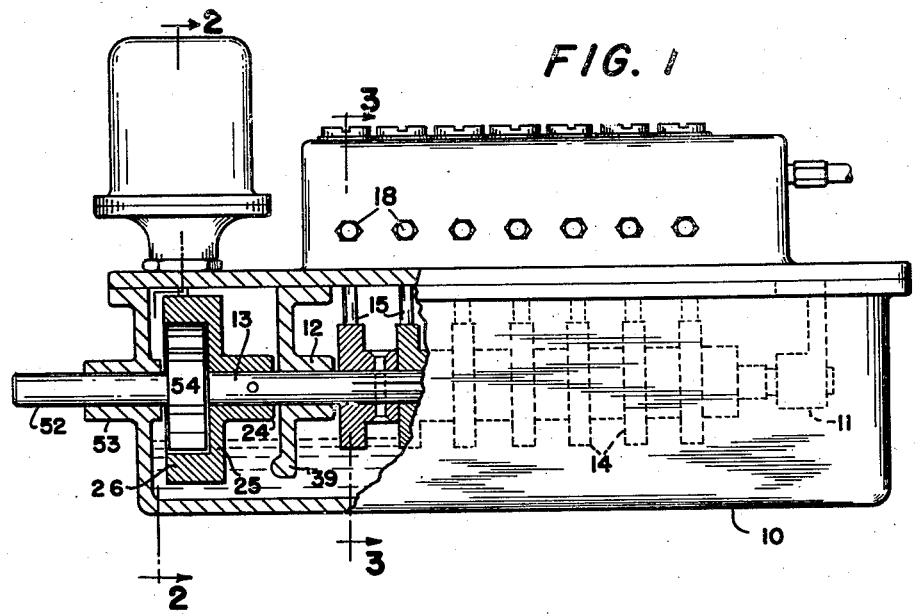
FIG. 1
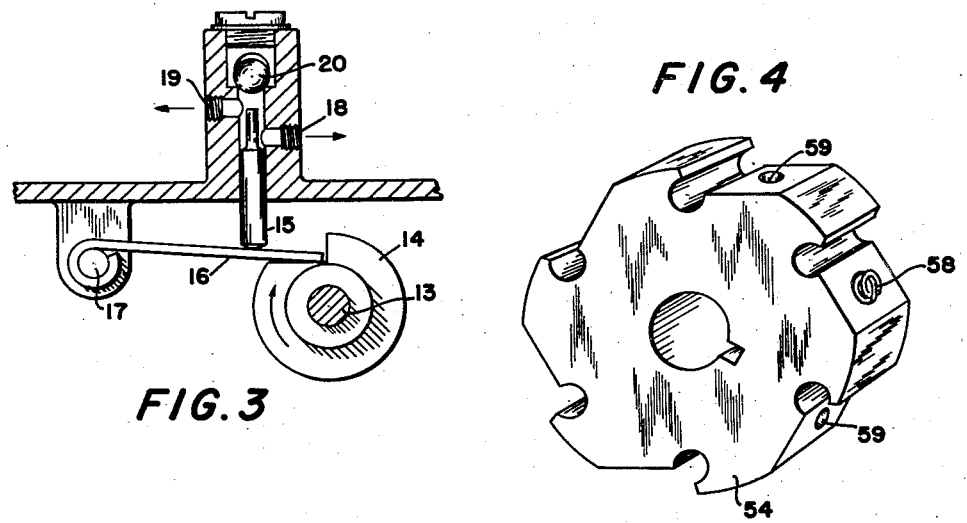
FIG. 3
FIG. 4
PER F. SKOOG
*INVENTOR*
BY *Smith & Tuck*
ATTORNEY Feb. 6, 1945.  P. F. SKOOG  2,368,892
CLUTCH MECHANISM
Filed Nov. 25, 1942  2 Sheets-Sheet 2
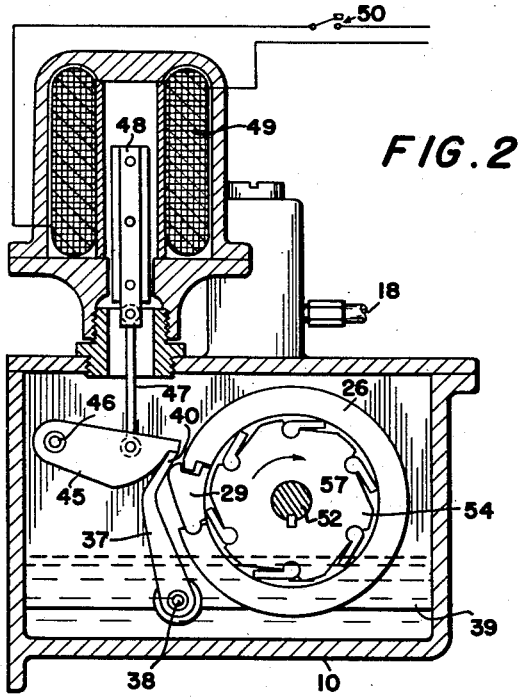
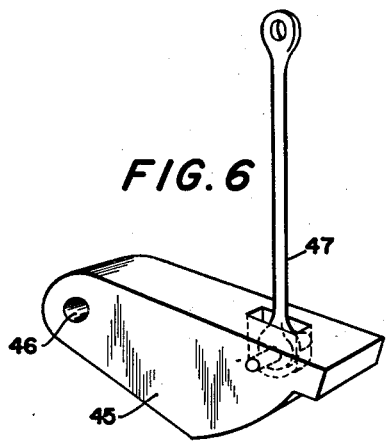
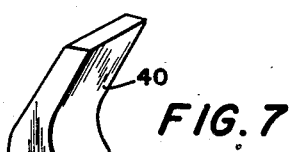
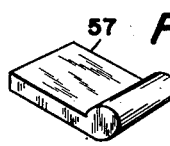
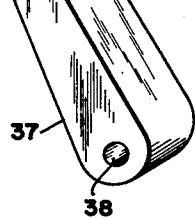
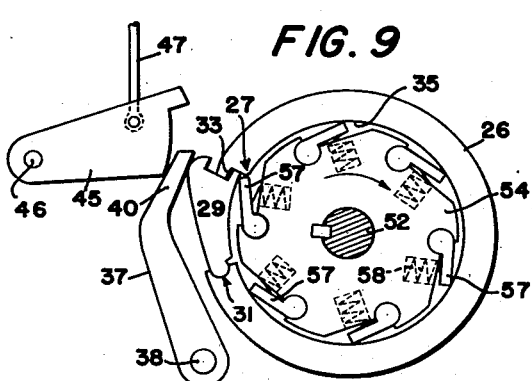
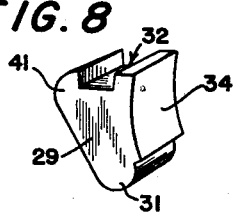
PER F. SKOOG
INVENTOR
BY *Smith & Tuck*
ATTORNEY Patented Feb. 6, 1945

2,368,892

UNITED STATES PATENT OFFICE 2,368,892

CLUTCH MECHANISM

Per F. Skoog, Olympia, Wash.

Application November 25, 1942, Serial No. 466,882

4 Claims. (Cl. 192—28)

My invention relates to a clutch mechanism and more particularly to an intermittent motion mechanism suitable for coupling a constantly rotating shaft with one to be intermittently rotated.

There has been a long-felt need for a simple clutch mechanism for use between a constantly rotating shaft and an intermittently rotatable shaft; one in which a simple construction and operation is embodied.

Having in mind the defects of the prior art clutch mechanism, it is an object of my invention to provide an axial clutch mechanism that is easily constructed and will operate efficiently for long periods of time without attention.

Another object of my invention is to provide, in a clutch mechanism of the type described, a coupling of a drive shaft and a driven shaft for intermittent rotation of the latter without overrun upon an uncoupling of the rotary members.

A still further and more specific object of my invention is the provision, in a clutch mechanism of the type described, of locking and pressing means for a displaceable element and which are of the simplest construction and operation and will not be deleteriously affected after many uses.

The foregoing objects and others ancillary thereto I prefer to accomplish as follows:

According to a preferred embodiment of my invention, I provide a constantly turning rotor having one or more outwardly urged latch dogs mounted in its outer periphery. Surrounding the rotor is a clutch ring having a movable portion to expose a latch shoulder for engagement by one of the dogs of the rotor. The shoulder of the clutch ring is shielded by the movable portion to normally prevent the latching dog from engaging with the shoulder, but which portion, upon movement, permits the dog of the rotor to couple with the clutch ring and carry the latter into rotation. The movable portion is incorporated in the arrangement as a detent shoe that is pivotally associated with the clutch ring, and this shoe is restrained from movement by a presser shoe carried on a pivoted arm. The shoe is normally locked in pressing contact with the detent. For the purpose of locking the presser shoe a locking dog is employed and remotely controllable means are employed for moving the locking dog out of this locking position upon occasion. Coupled to the clutch ring is a shaft which may be employed for moving various types of mechanisms, but which is shown in the drawings accompanying this application as comprising a cam shaft for the operation of a battery or series of valves.

The novel features that I consider characteristic of my invention are set forth with particularity in the appended claims. The invention itself, however, both as to its organization and method of operation, together with additional objects and advantages thereof, will best be understood from the following description of a specific embodiment when read in connection with the accompanying drawings, in which Figure 1 is an elevational view of a device having my clutch mechanism incorporated therein, with portions broken away for convenience of illustration;

Figure 2 is a vertical sectional view taken on line 2—2 of Figure 1;

Figure 3 is an enlarged vertical sectional view taken on line 3—3 of Figure 1;

Figure 4 is a perspective view of the rotor of my clutch mechanism;

Figure 5 is a perspective view of a latch dog employed in connection with the rotor of Figure 4;

Figure 6 is a perspective view of a locking dog employed in my clutch mechanism;

Figure 7 is a perspective view of a presser arm that is cooperatively used in my clutch mechanism;

Figure 8 is a perspective view of a detent shoe of my clutch mechanism; and

Figure 9 is an enlarged detail view in elevation of the working parts of the clutch mechanism.

A clutch mechanism, to overcome the defects hereinbefore enumerated, must have at least two totally distinct characteristics; it must be capable of operating quickly in response to a remotely controlled actuation device; and it must be capable of rapid disengaging upon the occurrence of a certain function of the mechanism to which the clutch is coupled. Accordingly, a preferred embodiment of my invention, referring to Figures 1 and 2, is incorporated in a device having a plurality of cam actuated valves. Within the casing 10 I provide journals 11 and 12 to support the cam shaft 13. A plurality of cams 14, carried by the shaft, each operates to raise a valve pin 15 that rests upon a cam follower 16 remotely pivoted at 17 and having its free end resting upon the cam surface. The pin 15 may serve to open and close ports 18 and 19 and to raise the ball 20 to permit the flow of fluid under pressure as directed by various conduits that are connected to said ports.

To the cam shaft, by means of the hub 24 and its clutch plate 25, I couple the clutch ring 26. The clutch ring 26 is broken at one point and has the clutch shoulder 27. Pivotally mounted in the break in the clutch ring is a detent shoe 29 that has a semi-cylindrical portion 30 that rests in a semi-cylindrical cup 31 for pivoting movement. Across the upper end of the shoe 29 is a groove 32 which receives the lip 33 on the clutch ring. The dimensions of the groove 32 are somewhat greater than the thickness of the lip 33, so that the shoe 29, in pivoting outward with respect to the ring, exposes the shoulder 27 and in swinging inwardly shields the shoulder. An inner curved face 34 of the shoe conforms to the inner curved face 35 of the clutch ring.

To retain the shoe so that face 34 is in alignment with face 35 of the clutch ring, I employ the presser arm 37 which is pivoted at 38 to a web 39 within the casing 10. Arm 37 has the presser shoe 40 on its end, which is adapted to normally rest upon a hump or horn 41 of the detent shoe 29. A locking dog 45 pivoted at 46 to the web 39 acts upon the presser shoe to retain it against the detent shoe.

It will be seen that, by raising the locking dog 45, the presser arm and its presser shoe may swing to the left in Figures 2 and 9 and permit the detent shoe 29 to also swing to the left to expose the shoulder 27. The locking dog is raised by a link 47 which is coupled between the dog and, at its upper end, the solenoid core 48 that is interposed in the field of the coil 49. The closing of switch 50 completes an electrical circuit through the coil 49 which is then energized according to the known operation of such a solenoid construction. The core 48 is lifted upwardly into the field, thus lifting the locking dog 45.

A shaft 52 mounted in the journal 53 carries on its inner end a rotor 54 that is disposed interiorly of the clutch ring 26. The rotor 54 has a plurality of latch dogs 57 pivotally mounted in its outer periphery, and as can be seen in the drawings, all of the dogs are directed in the normal direction of rotation of the rotor. Springs 58 seated in suitable recesses 59 press on the under face of the dogs and tend to force them upwardly against the inner face 35 of the clutch ring and against the face 34 of the detent shoe.

When the locking dog 45 is in the lower position as shown in Figure 2, the inner face of the clutch ring is absolutely smooth and rotation of the rotor and its dog effects no coupling with the clutch ring. Upon the operation of the solenoid to lift the dog as shown in Figure 9, the arm 37 swings to the left permitting the detent shoe 29 to also swing and expose the shoulder 27. Thereupon, the next arriving latch dog of the rotor contacts the shoulder 27, picks up the clutch ring 26 and carries it in rotary motion along with the rotor.

When the solenoid is de-energized, the locking dog is permitted to fall against the presser shoe 40 and the weight of the dog thus applies a force to said shoe to press it against the outer periphery of the clutch ring. Under this circumstance, when the ring and the outwardly displaced detent shoe 29 rotates into contact with the shoe 40 the detent shoe is then displaced inwardly to disengage the latch dog 57 from the clutch ring and to permit alignment of the inner face of the clutch ring. Thereafter, until the solenoid is again energized and the locking dog lifted, the rotor will turn freely.

Although I have shown and described certain specific embodiments of my invention, I am fully aware that many modifications thereof are possible. My invention, therefore, is not to be restricted, except insofar as is necessitated by the prior art and by the spirit of the appended claims.

I claim:

1. A clutch mechanism, comprising: a rotor including means for rotating the same; a pivoted dog carried by said rotor and having a radial urgence; a clutch ring enclosing said rotor and its dog, said ring having a shoe swingable in the wall thereof, said shoe having a surface conforming to the inner surface of the ring, and a shoulder on said ring concealed interiorly by said movable shoe when the latter is aligned with the remainder of the clutch ring; means for retaining said shoe against outward displacement and for releasing said shoe on occasion whereupon the outwardly urged dog displaces the shoe and exposes and engages the shoulder of the clutch ring to couple the latter to the rotor, and a member coupled to said clutch ring for rotation therewith.

2. A clutch mechanism, comprising: a rotor including means for rotating the same, a pivoted dog carried by said rotor and having an outward urgence, a ring enclosing said rotor and its dog, a shoe movable in the wall of the ring and having a portion extending exteriorly thereof, a shoulder on said ring concealed interiorly by said shoe when the latter is disposed in alignment with the ring inner face, a presser shoe engaged with the exteriorly extending portion of the movable shoe to retain the latter in aligned position in the clutch ring, a locking dog to retain the presser shoe against the movable shoe, means for withdrawing the locking dog from its retaining position whereupon the outwardly urged dog of the rotor displaces the movable shoe outwardly and exposes and engages the shoulder of the clutch ring to couple the latter to the rotor, and a member coupled to said clutch ring for rotation therewith.

3. A clutch mechanism, comprising: a rotor including means for rotating the same, a pivoted dog carried by said rotor and having an outward urgence, a ring enclosing said rotor and its dog, a shoe having a surface conforming to the inner contour of said ring and being swingable in the wall of the ring, said shoe having a portion extending exteriorly of the ring, a shoulder on said ring concealed interiorly by said shoe when the latter is disposed in alignment with the ring inner face, a locking member to retain the movable shoe in aligned position with the clutch ring, means for withdrawing the locking member from its retaining position whereupon the outwardly urged dog of the rotor displaces the movable shoe outwardly and exposes and engages the shoulder of the clutch ring to couple the latter to the rotor, and a member coupled to said clutch ring for rotation therewith.

4. A clutch mechanism, comprising: a rotor including means for rotating the same, a pivoted dog carried by said rotor and having an outward urgence, a ring enclosing said rotor and its dog, a shoe movable in the wall of the ring and having a portion extending exteriorly thereof, a shoulder on said ring concealed interiorly by said shoe when the latter is disposed in alignment with the ring inner face, a presser shoe engaged with the exteriorly extending portion of the movable shoe to retain the latter in aligned position in the clutch ring, a locking dog to retain the presser shoe against the movable shoe, means for withdrawing the locking dog from its retaining position whereupon the outwardly urged dog of the rotor displaces the movable shoe outwardly and exposes and engages the shoulder of the clutch ring to couple the latter to the rotor, and a horn carried by said movable shoe for engagement by the presser shoe upon rotation of the clutch ring to arrest motion of the latter when the presser shoe is urged thereagainst, and a member coupled to said clutch ring for rotation therewith.

PER F. SKOOG.